(12) United States Patent  (10) Patent No.: US 8,294,559 B2
Yoshizawa et al.  (45) Date of Patent: Oct. 23, 2012

(54) VEHICLE CONTROL DEVICE FOR EMERGENCY CONTROL OF VEHICLE

(75) Inventors: Akihiro Yoshizawa, Shizuoka (JP); Hiroaki Kurita, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 1179 days.

(21) Appl. No.: 11/831,727

(22) Filed: Jul. 31, 2007

(65) Prior Publication Data

US 2009/0021361 A1  Jan. 22, 2009

(30) Foreign Application Priority Data

Aug. 2, 2006 (JP) ................................. 2006-211332

(51) Int. Cl.
*B60R 25/10* (2006.01)
(52) U.S. Cl. ................. 340/426.36; 340/426.3; 340/5.1; 340/5.2; 340/5.61; 340/5.72
(58) Field of Classification Search ..................... 340/5.2
See application file for complete search history.

(56) References Cited

U.S. PATENT DOCUMENTS

| | | | | |
|---|---|---|---|---|
| 3,812,403 A | * | 5/1974 | Gartner | 340/5.54 |
| 3,862,716 A | * | 1/1975 | Black et al. | 235/381 |
| 4,742,703 A | * | 5/1988 | DeWalch et al. | 70/366 |
| 5,006,843 A | * | 4/1991 | Hauer | 340/5.28 |
| 5,042,067 A | * | 8/1991 | Moriyama | 726/18 |
| 5,343,077 A | | 8/1994 | Yoshida et al. | |
| 5,432,500 A | * | 7/1995 | Scripps | 340/628 |
| 5,561,331 A | * | 10/1996 | Suyama et al. | 307/10.3 |
| 6,606,492 B1 | * | 8/2003 | Losey | 455/411 |
| 6,833,784 B1 | * | 12/2004 | Ishii et al. | 340/426.1 |
| 2004/0073795 A1 | * | 4/2004 | Jablon | 713/171 |
| 2004/0257201 A1 | * | 12/2004 | Suzuki | 340/5.72 |
| 2005/0179320 A1 | * | 8/2005 | Shimomura | 307/10.4 |
| 2005/0179588 A1 | * | 8/2005 | Kim | 342/357.07 |
| 2006/0109081 A1 | * | 5/2006 | Kimura et al. | 340/5.72 |
| 2006/0163947 A1 | * | 7/2006 | Onishi et al. | 307/10.2 |

FOREIGN PATENT DOCUMENTS

| | | |
|---|---|---|
| EP | 1 273 492 A2 | 1/2003 |
| JP | 10-176445 | 6/1998 |

* cited by examiner

*Primary Examiner* — Benjamin C Lee
*Assistant Examiner* — Curtis King
(74) *Attorney, Agent, or Firm* — Rabin & Berdo, P.C.

(57) ABSTRACT

A vehicle control device simplifies input work of a password that puts a vehicle in a usable state, on an emergency occasion, in which a portable equipment (smart key) cannot be used. A system display unit flashes on an emergency occasion when a password is input without the use of the smart key. A hazard switch is operated to enter a character of the password corresponding to a number of times that the system display unit flashes.

18 Claims, 9 Drawing Sheets

VEHICLE CONTROL DEVICE FOR EMERGENCY CONTROL OF VEHICLE

RELATED APPLICATIONS

This application claims the benefit of priority under 35 USC 119 of Japanese patent application no. 2006-211332, filed on Aug. 2, 2006, which application is hereby incorporated by reference in its entirety.

BACKGROUND OF THE INVENTION

1. Field of the Invention

The present invention relates to a vehicle control device, and more particularly to a vehicle control device capable of transmitting and receiving a signal from a portable equipment for certification of use permission of a vehicle.

2. Description of Related Art

Conventionally, there is known a vehicle burglarproof device (vehicle control device) capable of transmitting and receiving a signal from a transmitter (portable equipment) for certification of use permission of a vehicle (see, for example, JP-A-10-176445). JP-A-10-176445 discloses a method of canceling a state of precautions (state, in which a vehicle electric source is OFF) without the use of a transmitter, in the case where a battery on a transmitter is discharged or the transmitter itself is out of order. As the method of canceling a state of precautions, a password having four figures is input by intermittent ringing of a contact of first and second switches provided on a vehicle. Specifically, an input start point and a breakpoint of a password are input by inputting the first switch and numeric values of respective figures are input according to frequencies, in which the second switch is input, whereby a password having four figures is input. Where the password is compared to and agrees with a normal code, which is recorded on the vehicle burglarproof device, the state of precautions is cancelled to afford starting of an engine.

However, JP-A-10-176445 involves a problem that an input work of a password is complex in inputting the password since it is necessary to repeat an operation corresponding to one figure, in which the second switch is input predetermined times corresponding to a numeral of the password, four times (corresponding to four figures) after the first switch is input.

SUMMARY OF THE INVENTION

The invention addresses this problem and provides a vehicle control device that simplifies an input work of a password, which puts a vehicle in a usable state, on an emergency occasion, in which a portable equipment cannot be used.

In a first aspect of the invention, there is provided a vehicle control device that certifies use permission of a vehicle by a communication system making use of a portable equipment. The vehicle control device comprises a display unit that flashes on an emergency occasion when a password for certifying use permission of the vehicle is input without the use of the portable equipment, and a password input unit, with which the password is input according to a number of times that the display unit flashes.

With the vehicle control device in the first aspect, it is possible to decrease a number of times of input as compared with a case where a switch is input a number of times corresponding to a numeral of the password, because input for each character of the password is completed by counting the number of times that the display unit flashes, and instruction of completion of input is given only when the number of flashes corresponds to the password character. Thereby, input work of a password on an emergency occasion in which the portable equipment cannot be used is simplified.

In one embodiment, the password input unit includes a first switch. Where the password is to be input, ON and OFF operations of the first switch determine the number of times that the display unit flashes corresponding to the password. With such construction, the number of times that the display unit flashes corresponding to a password can be determined readily by a predetermined switch.

In one embodiment, even when an operating force is relaxed in respective ON and OFF states, the first switch maintains respective states. With such construction, since a hand can be separated from the first switch during flash, input work of a password is further simplified.

In one embodiment, a flash control unit flashes the display unit at predetermined intervals, which enables a user to readily count the number of times that the display unit flashes.

In one embodiment, the display unit is a system display unit that displays a state of the communication system. Since it is unnecessary to separately provide a display unit that is used only on an emergency occasion, the construction is not complex.

In one embodiment, a storage unit stores the password and a collation unit collates the input password with the password stored in the storage unit. The collation unit thereby collates the input password with the stored password.

In one embodiment, the password input unit is provided in a vicinity of a handle grip portion. Since a user can input a password while grasping the handle grip portion, the password can be input in a state in which the vehicle is stable.

In and one embodiment, the password input unit includes a hazard switch to flash a hazard lamp. Since it is unnecessary to separately provide a password input unit that is used only on an emergency occasion, construction is not complex.

In one embodiment, in inputting the password, the display unit is controlled to flash when the hazard switch is ON, without flashing the hazard lamp. It is thus possible to prevent revealing the password to a third person due to flash of the hazard lamp when the password is input.

In one embodiment, a second switch is operated plural times within a predetermined period of time to bring about a state in which the password can be input. Since the state in which the password can be input is not readily brought about, mistakenly bringing about the state in which the password can be entered is prevented.

In one embodiment, the second switch includes a detection switch that detects opened and closed states of a predetermined opening and closing portion provided on the vehicle. The opening and closing portion is opened and closed plural times within the predetermined period of time to bring about a state in which the password can be input. With such construction, predetermined opening and closing readily bring about the state in which the password can be input.

In one embodiment, the opening and closing portion includes a trunk portion that is opened and closed plural times within the predetermined period of time to bring about a state in which the password can be input. Thus, opening and closing the trunk portion readily brings about the state in which the password can be input.

In one embodiment, the trunk portion includes a lock portion for locking the trunk portion. Since only a person carrying a key for locking can bring about the state in which a password can be input, vehicle theft is further inhibited.

In one embodiment, an input operation mode starting switch is mounted to the vehicle and pushed on an emergency occasion before operation of the second switch to begin a password input operation mode on the emergency occasion. Since a standby state for the start of a password input operation mode can be brought about only when the input operation mode starting switch is pushed, battery consumption when the vehicle is not used is suppressed.

In one embodiment, when the collation unit collates the input password with a stored password, the display unit displays results of the collation. A user can thereby readily confirm the results of collation.

In one embodiment, the display unit displays different lighting patterns to signal agreement and disagreement as results of the collation. With such construction, in case of agreement and disagreement the construction is not complex.

In a second aspect of the invention, a vehicle comprises the vehicle control device having of the above constructions. It is thus possible to readily simplify input work of a password that puts the vehicle in a usable state, on an emergency occasion in which the portable equipment cannot be used.

Other features and advantages of the invention will be apparent from the following detailed description, taken in conjunction with the accompanying drawings which illustrate, by way of example, various features of embodiments of the invention.

DETAILED DESCRIPTION OF THE INVENTION

An embodiment of the invention is now described with reference to the drawings.

Figure 1:
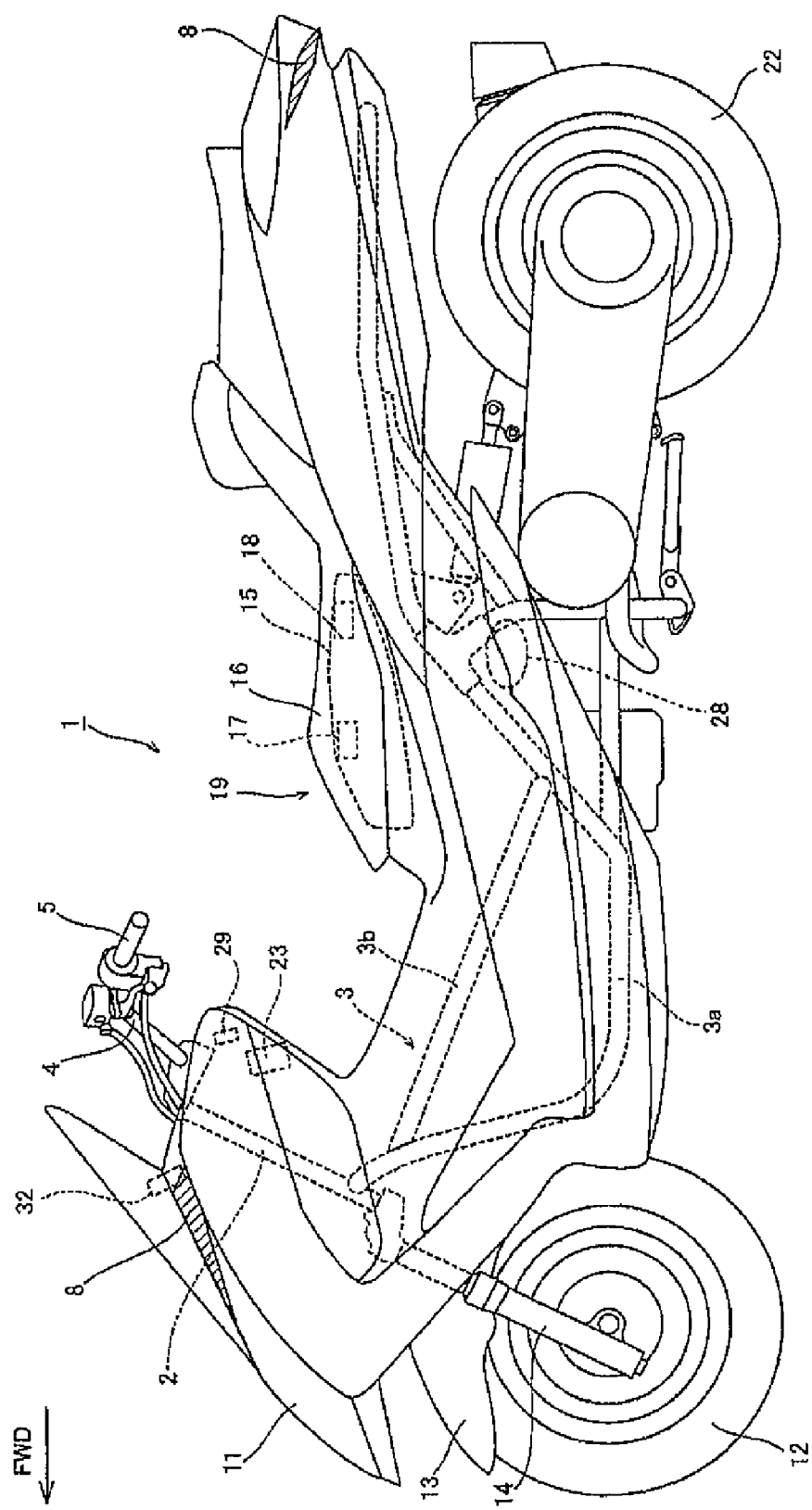
FIG. 1 is a side view of a motorcycle according to an embodiment of the invention.

FIG. 1 is a side view of a motorcycle 1 according to an embodiment of the invention. FIGS. 2-8 illustrate a vehicle control device of motorcycle 1. Motorcycle 1 is an example of a vehicle according to the invention. In FIG. 1, arrow FWD indicates the front in a traveling direction of the motorcycle. Motorcycle 1 and a vehicle control device 70 according to the embodiment of the invention are described with reference to FIGS. 1-8.

In motorcycle 1, a main frame 3 is arranged rearwardly of a head pipe 2. Main frame 3 includes a frame body portion 3a and a support portion 3b, which supports frame body portion 3a in two locations on an upper portion thereof. Head pipe 2 and main frame 3 constitute a body frame.

Figure 2:
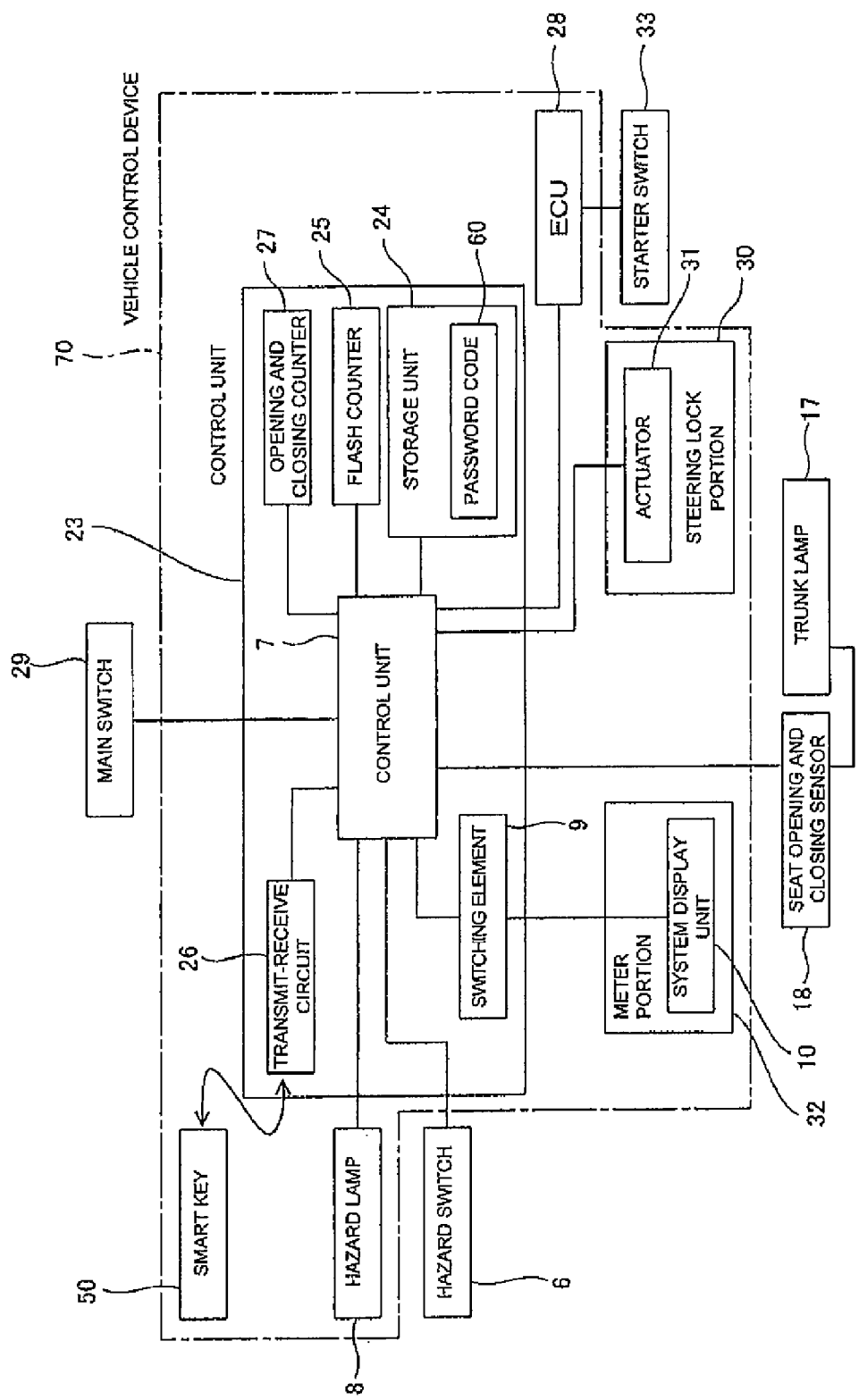
FIG. 2 is block diagram of a vehicle control device provided on the motorcycle of FIG. 1.
Figure 3:
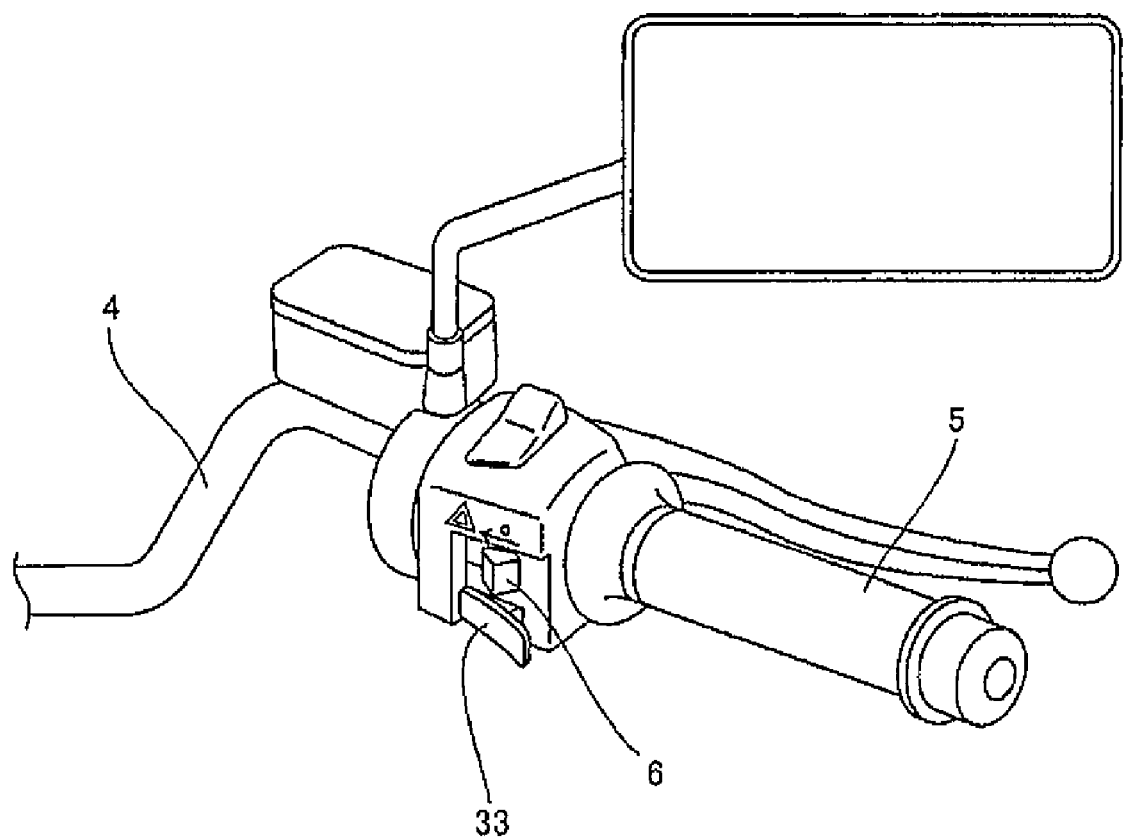
FIG. 3 is a perspective view of a right handle grip portion on the motorcycle of FIG. 1.

A handle 4 is arranged on an upper portion of head pipe 2. Handle grip portions 5 are provided on both ends of handle 4 to permit a user to steer motorcycle 1. As shown in FIG. 3, a hazard switch 6 is provided on the right handle grip portion 5. Hazard switch 6 is exemplary of a "password input portion" and a "predetermined switch" of the invention. As shown in FIG. 2, hazard switch 6 is connected to a control unit 7, and a hazard lamp 8 (FIG. 1) is connected to control unit 7. A system display unit 10 (FIGS. 2 and 8) is connected to control unit 7 through a switching element 9. Switching element 9 enables system display unit 10 to flash in a cycle of one second. System display unit 10 is exemplary of a "display unit" of the invention and switching element 9 is exemplary of a "flash control unit" off the invention. Control unit 7 is exemplary of a "collating unit" of the invention. System display unit 10 informs a user of a status of a communication system to a smart key 50 on normal occasions, and functions as a display unit for input of a password on emergency occasions. Hazard lamp 8 is constructed not to flash also in the case where hazard switch 6 is made ON when a processing is performed on an emergency occasion, in which smart key 50 cannot be used. A front cowl 11 covers the front of head pipe 2. A front wheel 12 and a front fender 13 are arranged above front wheel 12 and below front cowl 11. Front wheel 12 is mounted rotatably to lower portions of a pair of front forks 14.

Figure 7:
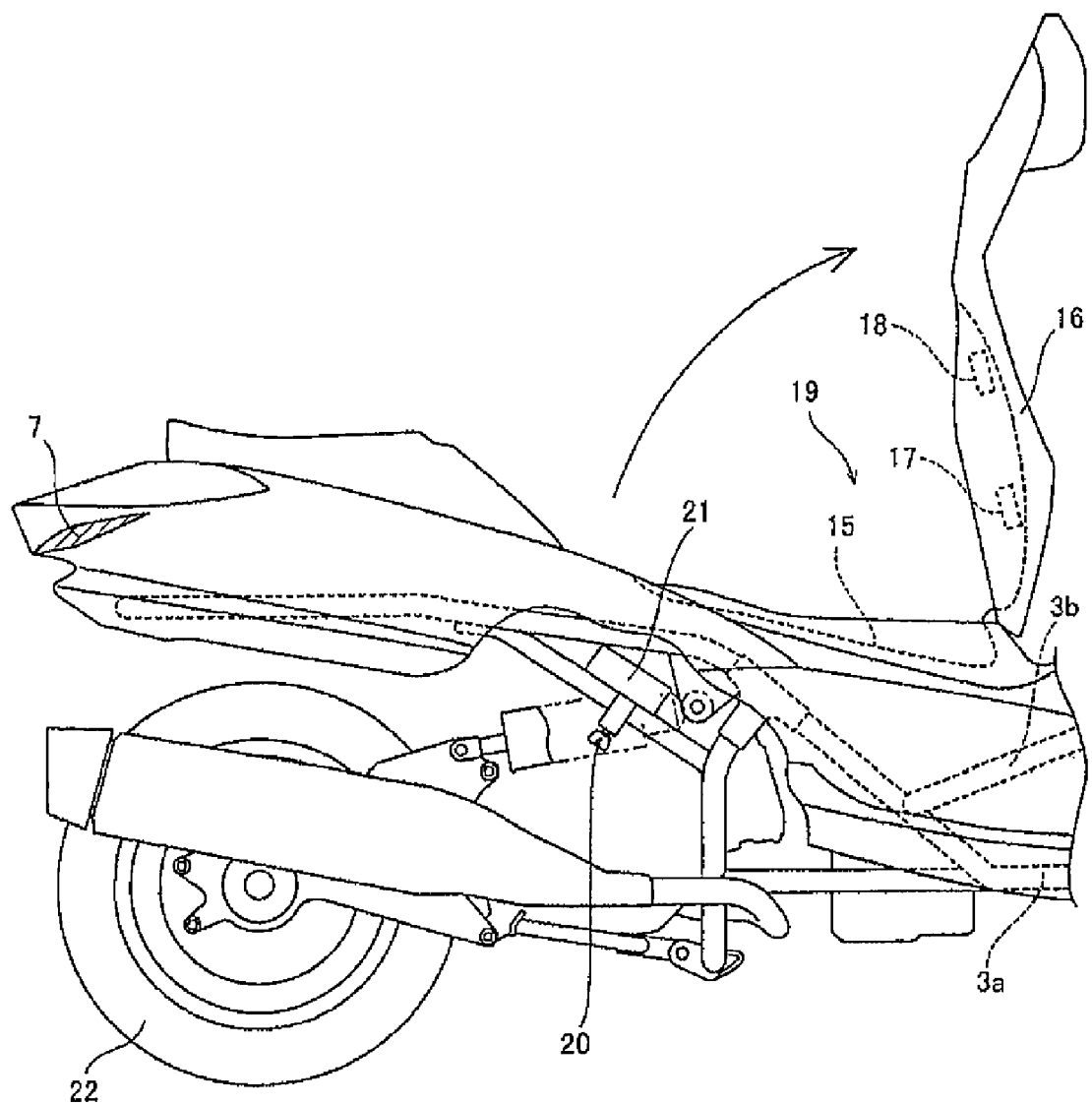
FIG. 7 is a partial side view showing seat movement on the motorcycle of FIG. 1.

A trunk 15 for storage of a package, etc. is provided on a rear, upper portion of main frame 3. As shown in FIG. 7, a seat 16 is arranged above trunk 15 to open and close trunk 15. A seat opening and closing sensor 18 (FIG. 2) illuminates a trunk lamp 17 provided inside trunk 15 when seat 16 is opened. A trunk part 19 comprises trunk 15, seat 16, trunk lamp 17 and seat opening and closing sensor 18. Trunk part 19 is exemplary of a "predetermined opening and closing part" of the invention. A mechanical lock part 21 is provided on a rear, lower portion of trunk part 19 to permit a mechanical key 20 (FIG. 4) to lock and unlock trunk part 19. Thereby, only a person having mechanical key 20 can open and close seat 16 on trunk part 19. Mechanical lock part 21 is exemplary of a "lock part" of the invention. A rear wheel 22 is arranged rotatably below a rear end of main frame 3.

A control unit 23 is provided rearwardly of head pipe 2 (FIG. 1). As shown in FIG. 2, control unit 23 includes a control unit 7. Switching element 9, a storage unit 24, a flash counter 25, a transmit-receive circuit 26, and an opening and closing counter 27 are connected to control unit 7. A password code 60, for use on emergency occasions when smart key 50 cannot be used, is stored in storage unit 24. In one embodiment, password 60 has six predetermined characters (for example, '935588'). Of course, password 60 may have more or less than six characters, as appropriate. An identification code provided in smart key 50, which is used on normal occasions in which smart key 50 can be used, is also stored in storage unit 24 Smart key 50 has a battery and records an identification code, which determines whether smart key 50 corresponds to motorcycle 1. Smart key 50 is exemplary of a "portable equipment" of the invention.

Control unit 7 is connected to ECU (Engine Control Unit) 28 arranged below seat 16, to a main switch 29 arranged below a center of handle 4 in a width direction, to an actuator 31 provided on a steering lock portion 30 that locks handle 4 when motorcycle 1 is not used, to system display unit 10 provided on a meter portion 32 arranged on a side of handle 4 above front cowl 10, to hazard lamp 8, to trunk lamp 17, and to seat opening and closing sensor 18. On a normal occasion, in which smart key 50 can be used, main switch 29 is used in order to put a system, which transmits an identification request signal to smart key 50 described later, in an ON or OFF state. On an emergency occasion, in which smart key 50 cannot be used, main switch 29 is pushed before inputting a password to begin an input operation mode for inputting the password, and is pushed after inputting the password to release steering lock portion 30 to put motorcycle 1 in a usable state. Main switch 29 is exemplary of an "input operation mode starting switch" of the invention. Control unit 7, ECU 28 and actuator 31 use a SCI (Serial Communication Interface) for serial communication. ECU 28 is connected to a starter switch 33 (FIG. 3) mounted in the vicinity of right handle grip portion 5. Vehicle control device 70 comprises hazard lamp 8, control unit 23, ECU 28, steering lock portion 30, meter portion 32 and smart key 50.

Control unit 7 communicates with transmit-receive circuit 26 and smart key 50 to certify use permission of motorcycle 1 when main switch 29 is ON, in a normal occasion in which smart key 50 can be used, and puts motorcycle 1 in a usable state when it is determined that smart key 50 is a smart key corresponding to motorcycle 1. Specifically, control unit 7 transmits an identification code request signal via transmit-receive circuit 26 to smart key 50 when a user pushes main switch 29 and starter switch 33. Transmit-receive circuit 26 then transmits an identification code signal received from smart key 50 to control unit 7.

In an emergency during which smart key 50 cannot be used, control unit 7 determines whether an input password (for example, '935588') agrees with password code 60 stored in storage unit 24.

Figure 4:
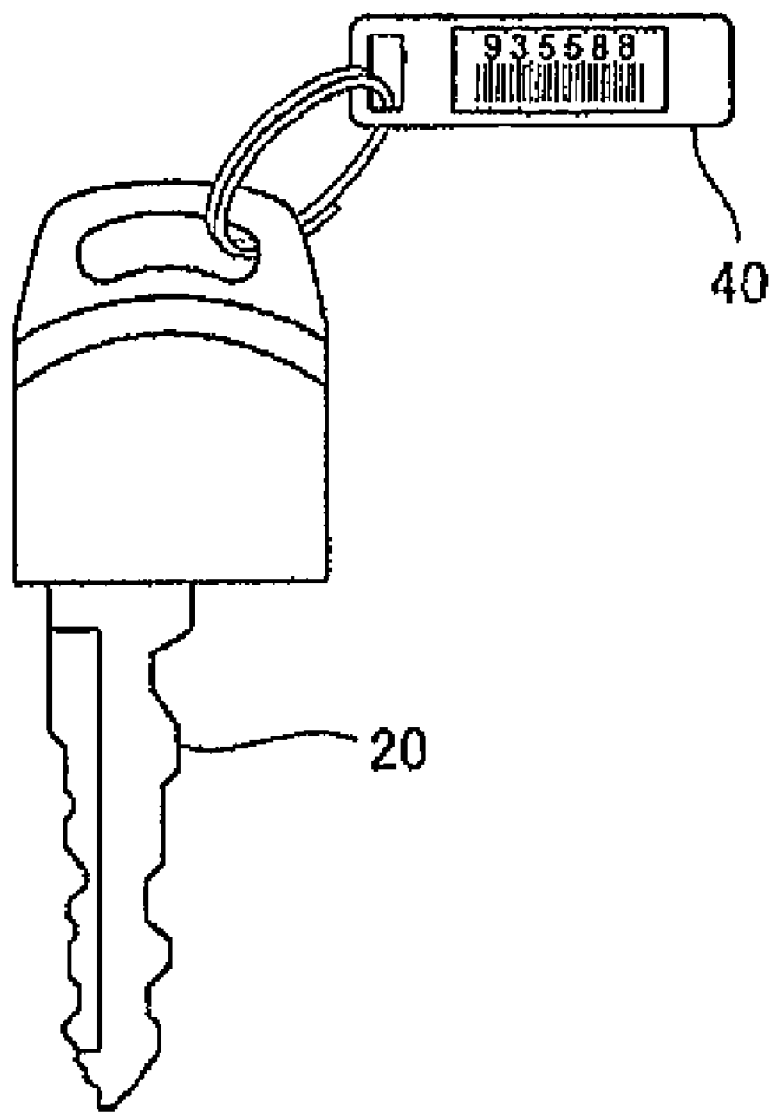
FIG. 4 is a front view of a mechanical key on the motorcycle of FIG. 1.
Figure 5:
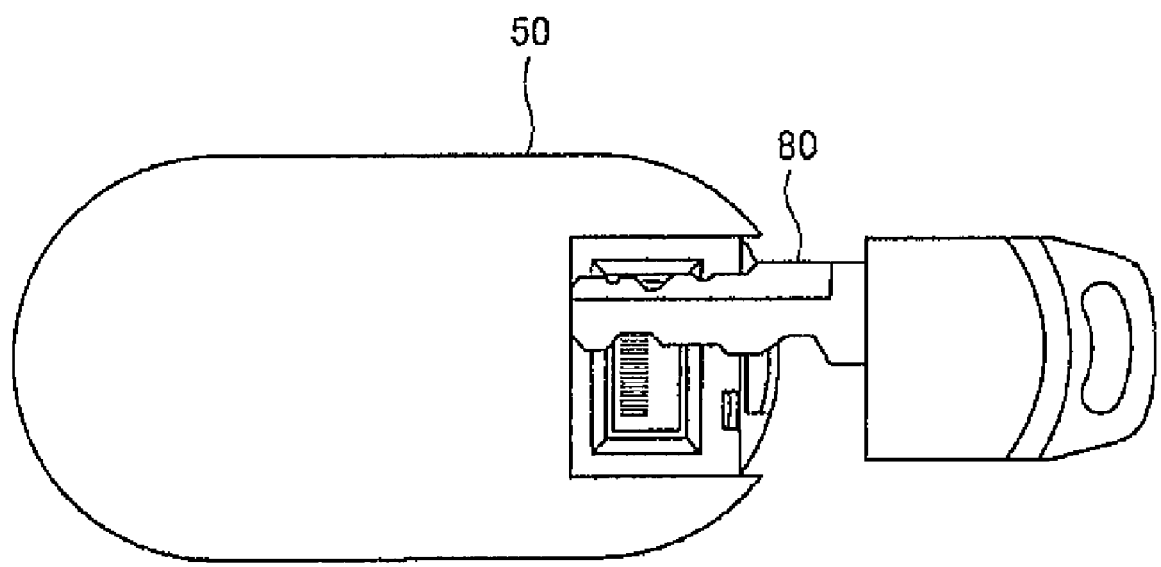
FIG. 5 is a front view of a smart key and a mechanical key of the vehicle control device of the motorcycle of FIG. 1.
Figure 6:
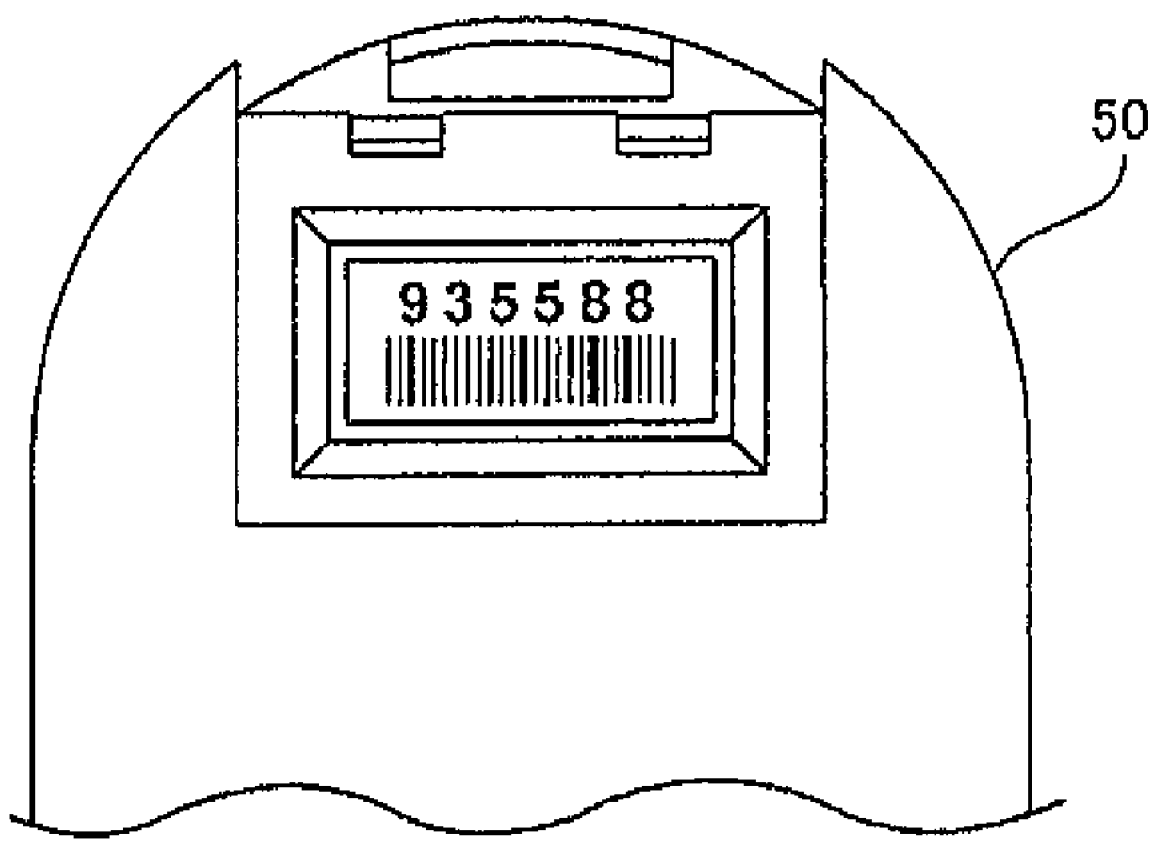
FIG. 6 is a front view of a smart key of the vehicle control device of the motorcycle of FIG. 1.

As shown in FIG. 5, a mechanical key 80, of the same type as mechanical key 20 of mechanical lock part 21, is mounted detachably in smart key 50. Thereby, on an emergency occasion in which smart key 50 cannot be used, mechanical key 80 can be used. Mechanical key 80 is mounted detachably in smart key 50 so that a user of motorcycle 1 does not usually need to carry mechanical key 20 and smart key 50. As shown in FIG. 6, a password corresponding to motorcycle 1 is labeled on a portion of smart key 50 that is covered and hidden by mechanical key 80 when mechanical key 80 is mounted to smart key 50. Thereby, the password, is not read by a third person. Also, as shown in FIG. 4, the password is labeled on a tag 40 that is mounted to mechanical key 20.

System display unit 10 is connected to flash counter 25 through control unit 7, so that the number of times that system display unit 10 flashes can be counted. Also, seat opening and closing sensor 18 is connected to opening and closing counter 27 through control unit 7, so that the number of times that seat 16 is opened and closed can be counted.

A method of inputting a password according to the embodiment is described with reference to FIGS. 2-8.

As shown in FIG. 7, on an emergency occasion in which smart key 50 cannot be used, a user turns main switch 29 ON, and thereafter uses mechanical key 20 or mechanical key 80 within a predetermined period of time to release mechanical lock part 21 and to open and close seat 16 a predetermined number of times. In one embodiment, mechanical key 20 or 80 must be used within fifteen seconds to release mechanical lock part 21, and seat 16 must be opened and closed three times.

Figure 8:
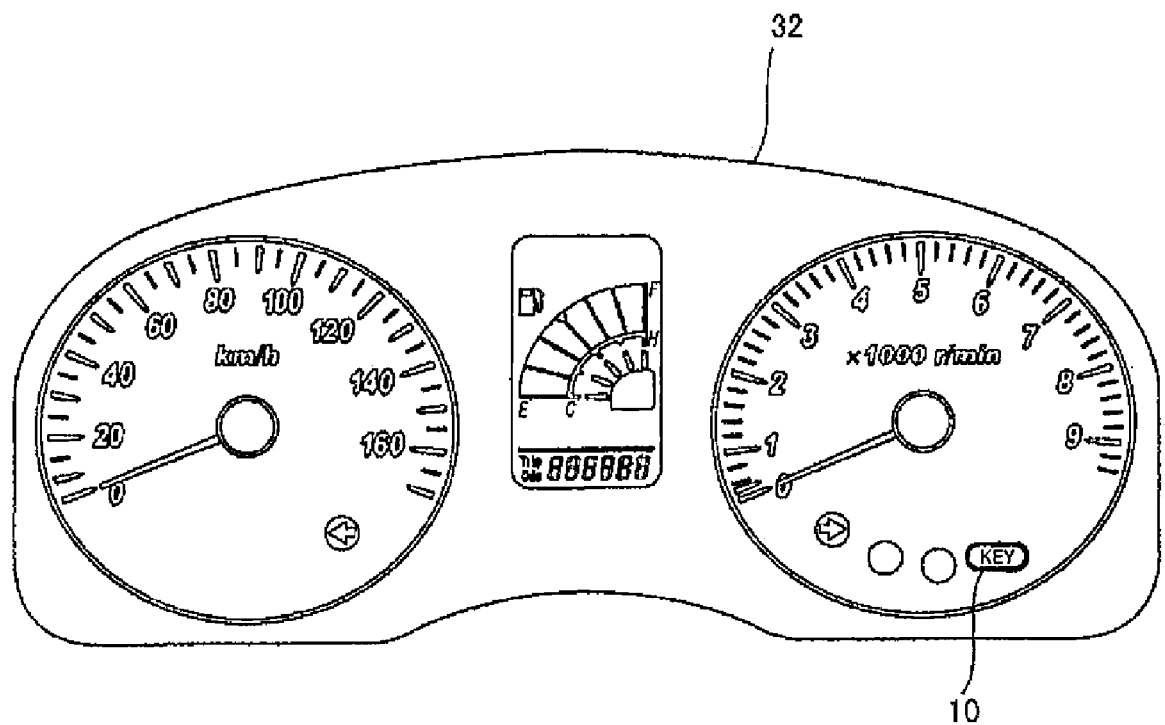
FIG. 8 is a front view of a meter portion of the motorcycle of FIG. 1.

A user then begins inputting the password within a predetermined period of time after opening and closing seat 16 three times. In one embodiment, the user begins inputting the password within ten seconds after opening and closing seat 16 three times. The password is input by utilizing hazard switch 6 and counting the number of times that system display unit 10 flashes. For example, in the previous example of a six character password '935588', character "9" of the password is first input. In this case, after opening and closing seat 16 three times, a user turns hazard switch 6 (FIG. 3) ON within ten seconds to begin flashing system display unit 10 (FIG. 8).

After system display unit 10 has flashed nine times, hazard switch 6 is turned OFF. Thereby, the first character of the password is set as "9". Thus, a user is not required to operate hazard switch 6 nine times, but instead turns hazard switch 6 ON, counts nine flashes of system display unit 10, and then turns hazard switch 6 OFF. Thereafter, a user repeats this operation for each character in the password until all characters are entered.

When the complete six character password has been entered, system display unit 10 is illuminated to signal that the password has been exactly input. The user then turns main switch 29 ON while system display unit 10 is illuminated (within a set time period such as ten seconds), whereby steering lock portion 30 is released and motorcycle 1 is put in a usable state.

Figure 9:
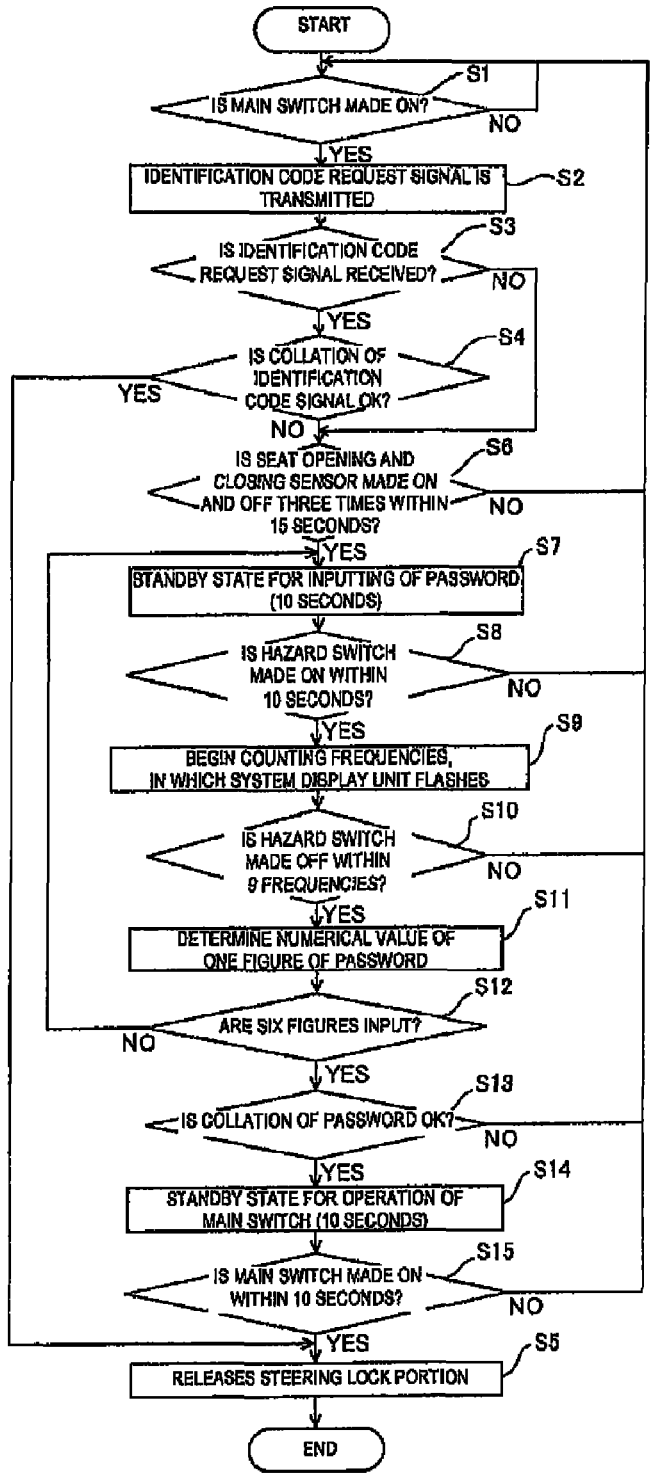
FIG. 9 is a flowchart of a processing flow of the vehicle control device on the motorcycle of FIG. 1.

FIG. 9 is a flowchart illustrating the processing flow of the vehicle control device. With reference to FIGS. 2 and 9, a detailed explanation is now given to the processing flow on a side of vehicle control device 70 according to the embodiment when motorcycle 1 is put in a usable state.

In STEP S1 of FIG. 9, it is determined whether main switch 29 is turned ON. If main switch 29 is not turned ON, STEP S1 is repeated. If main switch 29 is turned ON, this fact is transmitted to control unit 7 and the procedure proceeds to STEP S2. In STEP S2, an identification code request signal is transmitted to smart key 50 by transmit-receive circuit 26. If smart key 50 is in a communication enabled range (about 1 km) of control unit 23 (transmit-receive circuit 26), smart key 50 receives the identification code request signal and transmits an identification code signal to transmit-receive circuit 26.

Thereafter, it is determined in STEP S3 whether the identification code signal is received by transmit-receive circuit 26. If the identification code signal is not received, the procedure proceeds to STEP S6. If the identification code signal is received, the procedure proceeds to STEP S4.

In STEP S4, the received identification code signal is transmitted to control unit 7. Control unit 7 determines whether the identification code in the identification code signal received from smart key 50 agrees with an identification code recorded in storage unit 24. If the identification code received from smart key 50 agrees with the identification code recorded in storage unit 24, the procedure proceeds to STEP S5. In STEP S5, actuator 31 releases steering lock portion 30 to put motorcycle 1 in a usable state, and processing is terminated. If the identification code received from smart key 50 does not agree with the identification code recorded in storage unit 24, the procedure proceeds to STEP S6.

In STEP S6, seat 16 is opened and closed three times or more within fifteen seconds (see FIG. 7). In this regard, opening and closing counter 27 counts whether seat opening and closing sensor 18 is made ON and OFF three times or more. If seat opening and closing sensor 18 is not made ON and OFF three times within fifteen seconds, the procedure returns to STEP S1. If seat opening and closing sensor 18 is made ON and OFF three times within fifteen seconds, the procedure proceeds to STEP S7. In STEP S7, a standby state for inputting of a password continues for ten seconds and the procedure proceeds to STEP S8.

It is determined in STEP S8 whether, in order to input the first character of the six character password, hazard switch 6 has been turned ON within ten seconds after seat opening and closing sensor 18 is made ON and OFF three times. If hazard switch 6 is not turned ON within ten seconds, the procedure returns to STEP S1. If hazard switch 6 is turned ON within ten seconds, the procedure proceeds to STEP S9. In STEP S9, flash counter 25 begins counting the number of times that system display unit 10 flashes, and the procedure proceeds to STEP S10. In this regard, switching element 9 causes system display unit 10 to flash once per second, so that a user can visually confirm the number of times that system display unit 10 flashes. At this time, hazard lamp 8 is controlled not to flash.

Thereafter, it is determined in STEP S10 whether hazard switch 6 is turned OFF within nine flashes of system display unit 10. If hazard switch 6 is not turned OFF within nine flashes, the procedure returns to STEP S1. If hazard switch 6 is turned OFF within nine flashes, the procedure proceeds to STEP S11. In STEP 511, the number of times that system display unit 10 flashed is determined as a numerical value of a first character (figure) of a password having six characters. Thereafter, the procedure proceeds to STEP S12.

In STEP S12, control unit 7 determines whether six characters (figures) have been input. In this regard, it should be understood that the password may contain more or less than six characters, and that STEP S12 will determine whether the number of characters in the password have been entered. Returning to the example, if six characters have not been input, the procedure returns to STEP S7 to come to a standby state awaiting entry of the next character of the password. When all six characters have been input, the procedure proceeds to STEP S13.

In STEP S13, control unit 7 determines whether the input password corresponds to password code 60 stored in storage unit 24. If the input password does not correspond to password code 60 stored in storage unit 24, the procedure returns to STEP S1. If the input password corresponds to password code 60 stored in storage unit 24, the procedure proceeds to STEP S14. STEP S14 is a standby state of ten seconds awaiting an ON operation of main switch 29 during which system display unit 10 is illuminated to provide confirmation that the entire password has been input.

In STEP S15, control unit 7 determines whether main switch 29 was turned ON in the standby state of ten seconds. If main switch 29 was not turned ON in the standby state of ten seconds, the procedure returns to STEP S1. If main switch 29 was turned ON in the standby state of ten seconds, the procedure proceeds to STEP S5. In STEP S5, actuator 31 releases steering lock portion 30 to put motorcycle 1 in a usable state, and processing is terminated.

According to the embodiment, the amount of input is decreased as compared with a case where a switch must be repeatedly operated a number of times corresponding to the value of each character of a password, because input for each character is completed not by repeated operation of a switch but by counting the number of times that system display unit 10 flashes, and turning hazard switch 6 OFF when the number of flashes equal the numeral of the password character. Thereby, when smart key 50 cannot be used, the work of inputting a password is simplified.

Also, the state in which a password can be input is not readily brought about. It is brought about only by opening and closing seat 16 three times or more within fifteen seconds after main switch 29 is turned ON. This inhibits bringing about the state in which a password can be input by mistake.

Also, according to the embodiment, since trunk part 19 is locked with mechanical key 20 and mechanical lock part 21, only a person carrying mechanical key 20 can bring about the state in which a password can be input, thereby further inhibiting theft of motorcycle 1.

Also, according to the embodiment, a standby state for the start of a password input operation mode is brought about only when main switch 29 is turned ON, so that battery consumption is inhibited when motorcycle 1 is not used.

The embodiment disclosed herein is exemplary in all respects and not limitative. The scope of the invention is indicated not by the description of the embodiment but by the claims, and embraces all changes within the meaning and range of equivalence of the claims.

For example, while the embodiment describes a motorcycle as an example of a vehicle provided with a vehicle control device and smart key, the invention is not limited thereto and is applicable to other vehicles such as bicycles, three-wheelers, ATVs (all-terrain vehicles), etc. that use a vehicle control device and smart key.

Also, while the embodiment describes a password having six characters, the invention is not limited thereto but encompasses passwords having more or less than six characters. Moreover, the invention fully embraces modifications to other frequencies and time periods that were described in the embodiment. For example, the seat may be opened and closed more or less than three times to initiate the password entry state. Time periods such as ten seconds, fifteen seconds, etc., may be longer or shorter as appropriate.

Also, while the embodiment describes counting flashes of a system display unit to enter a password, the invention is not limited thereto. For example, the flashes of a hazard lamp may be counted to enter the password. As another example, the password may be input by counting the number of times that a sound issues from an alarm portion provided on the vehicle.

Also, while the embodiment illustrates an example in which a hazard switch is used as an input portion of a password, the invention is not limited thereto. For example, the main switch or a starter switch may be used to enter the password.

The invention claimed is:

1. A vehicle control device, in which certification of use permission of a vehicle is made by a communication system making use of a portable equipment, the vehicle control device comprising:
   a display unit that flashes on an emergency occasion when a password for certification of use permission of the vehicle is input without the use of the portable equipment, and
   a password input unit, with which the password is input according to a number of times that the display unit flashes,
   wherein the password input unit includes a first switch, and
   in a case where the password is to be input, timing of the ON and OFF operations of the first switch coinciding with a number of times that the display unit flashes determines each character of the password to be input, and
   wherein a second switch is provided on the vehicle, and
   the second switch is operated plural times within a predetermined period of time to bring about a state in which the password can be input, and
   wherein the display unit is a system display unit that displays a state of the communication system.

2. The vehicle control device according to claim 1, wherein even when an operating force is relaxed in respective ON and OFF states, the first switch maintains respective states.

3. The vehicle control device according to claim 1, further comprising a flash control unit that flashes the display unit at predetermined intervals.

4. The vehicle control device according to claim 1, further comprising:
   a storage unit that stores the password, and
   a collation unit that collates the input password with the password stored in the storage unit.

5. The vehicle control device according to claim 4, wherein when the collation unit collates the input password with a password stored in the storage unit, the display unit displays results of the collation.

6. The vehicle control device according to claim 5, wherein the display unit displays, in different lighting patterns, agreement and disagreement as results of the collation.

7. The vehicle control device according to claim 1, further comprising:
a handle grip portion provided on the vehicle to steer the vehicle, and
wherein the password input unit is provided in the vicinity of the handle grip portion.

8. The vehicle control device according to claim 7, wherein:
a hazard lamp is provided on the vehicle, and
the password input unit includes a hazard switch to flash the hazard lamp.

9. The vehicle control device according to claim 1, wherein
the second switch includes a detection switch that detects opened and closed states of a predetermined opening and closing portion provided on the vehicle, and
the opening and closing portion is opened and closed plural times within the predetermined period of time to bring about the state, in which the password can be input.

10. The vehicle control device according to claim 9, wherein
the opening and closing portion includes a trunk portion, and
the trunk portion is opened and closed plural times within the predetermined period of time to bring about the state in which the password can be input.

11. The vehicle control device according to claim 10, wherein the trunk portion includes a lock portion for locking the trunk portion.

12. The vehicle control device according to claim 1, further comprising an input operation mode starting switch mounted to the vehicle and pushed on an emergency occasion before operation of the second switch to begin a password input operation mode.

13. The vehicle control device according to claim 1, wherein the portable equipment is a smart key.

14. The vehicle control device according to claim 13, wherein the smart key includes a mechanical key for unlocking a seat of the vehicle.

15. The vehicle control device according to claim 14, wherein the mechanical key when mounted conceals the password affixed to the smart key.

16. A vehicle comprising the vehicle control device according claim 1.

17. The vehicle control device according to claim 1, wherein the state in which the password can be input also includes determining if the inputted password corresponds to a stored password.

18. A vehicle control device, in which certification of use permission of a vehicle is made by a communication system making use of a portable equipment, the vehicle control device comprising:
a display unit that flashes on an emergency occasion when a password for certification of use permission of the vehicle is input without the use of the portable equipment,
a password input unit, with which the password is input according to a number of times that the display unit flashes,
wherein the password input unit includes a first switch,
in a case where the password is to be input, timing of the ON and OFF operations of the first switch coinciding with a number of times that the display unit flashes determines each character of the password to be input, and
a handle grip portion provided on the vehicle to steer the vehicle, and
wherein the password input unit is provided in the vicinity of the handle grip portion,
a hazard lamp is provided on the vehicle,
the password input unit includes a hazard switch to flash the hazard lamp,
wherein in inputting the password, the display unit is controlled to flash when the hazard switch is made ON, without flashing the hazard lamp.

* * * * *